(12) United States Patent
Castagna

(10) Patent No.: US 6,464,299 B1
(45) Date of Patent: Oct. 15, 2002

(54) VEHICLE SEAT

(75) Inventor: Stéphane Castagna, Chanu (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 09/678,988

(22) Filed: Oct. 4, 2000

(30) Foreign Application Priority Data

Oct. 8, 1999 (FR) .............................................. 99 12570

(51) Int. Cl.[7] .................................................. B60N 2/24
(52) U.S. Cl. .............................. 297/378.12; 297/378.14
(58) Field of Search ........................ 297/378.12, 378.14

(56) References Cited

U.S. PATENT DOCUMENTS

| | | | | |
|---|---|---|---|---|
| 4,045,082 A | * | 8/1977 | Egert et al. ................. | 297/357 |
| 4,132,447 A | * | 1/1979 | Terada ........................ | 297/367 |
| 4,484,776 A | * | 11/1984 | Gokimoto et al. ....... | 296/65.09 |
| 4,484,779 A | * | 11/1984 | Suzuki ........................ | 297/367 |
| 5,052,748 A | | 10/1991 | Fourrey et al. | |
| 5,482,349 A | * | 1/1996 | Richter et al. ................. | 297/15 |
| 5,997,090 A | | 12/1999 | Baloche et al. | |
| 6,139,104 A | * | 10/2000 | Brewer ........................ | 297/353 |

FOREIGN PATENT DOCUMENTS

| | | |
|---|---|---|
| EP | 0 381 559 | 8/1990 |
| EP | 0 410 814 | 1/1991 |
| FR | 2 766 139 | 1/1999 |
| FR | 2 770 811 | 5/1999 |
| WO | 98/45136 | 10/1998 |

OTHER PUBLICATIONS

French Preliminary Search Report dated Jun. 15, 2000, French Application FR 9912570.

* cited by examiner

*Primary Examiner*—Peter M. Cuomo
*Assistant Examiner*—Joseph Edell
(74) *Attorney, Agent, or Firm*—Marshall, Gerstein & Borun

(57) ABSTRACT

Vehicle seat comprising a backrest and a seat part, a lower part of the backrest having a support frame and an intermediate frame which are pivotally mounted about a first axis on the seat part. The intermediate frame is linked to the seat part by an inclination-adjusting mechanism and to the support frame by a locking device. The support frame bears a top part of the backrest, which can be folded down into a flat position and which is linked to a mechanical coupling device designed to release the support frame when the top part of the backrest is in its flat position.

10 Claims, 3 Drawing Sheets

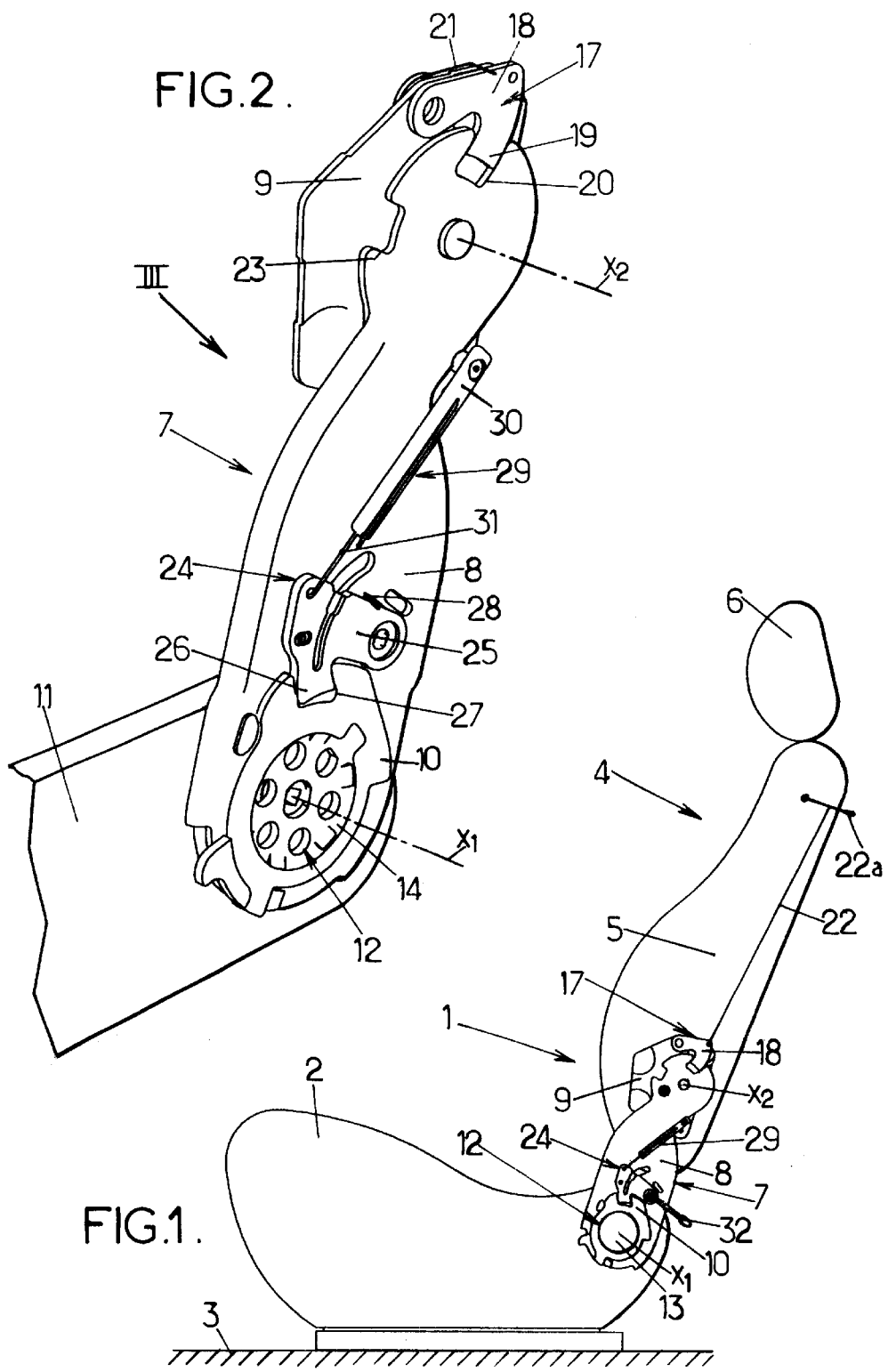

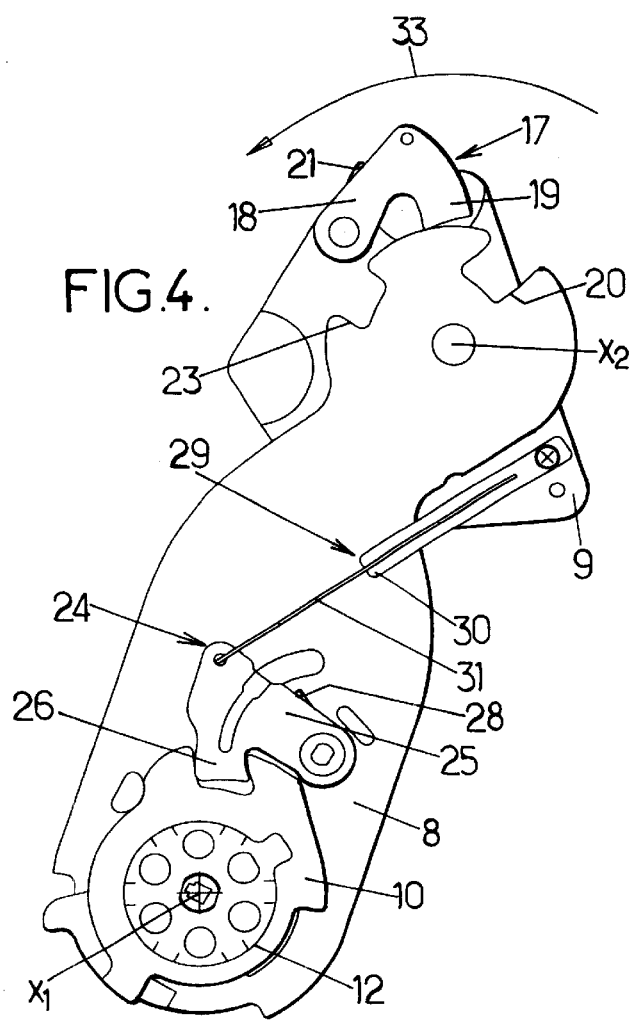

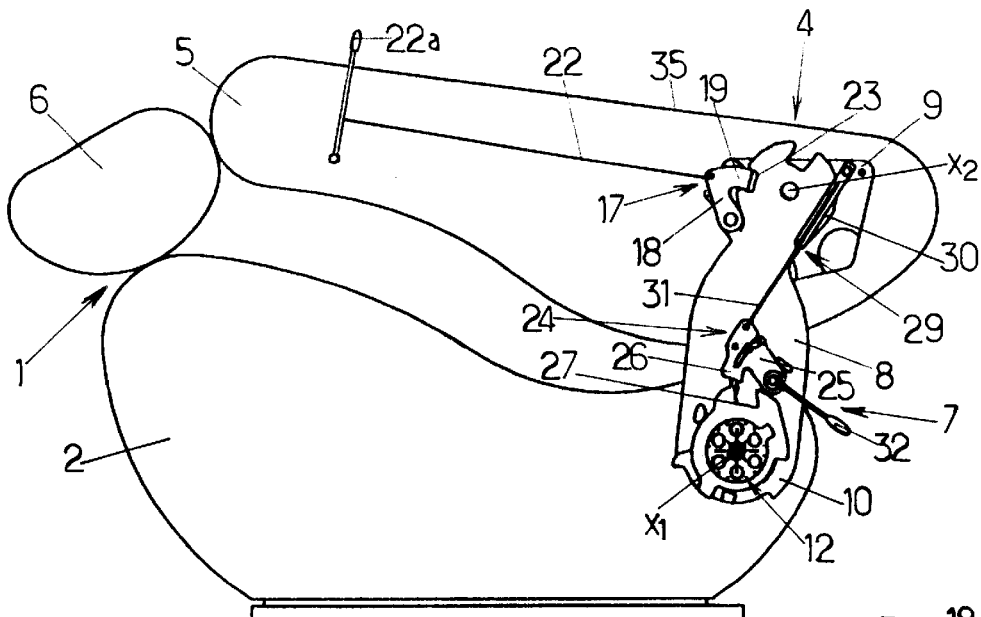
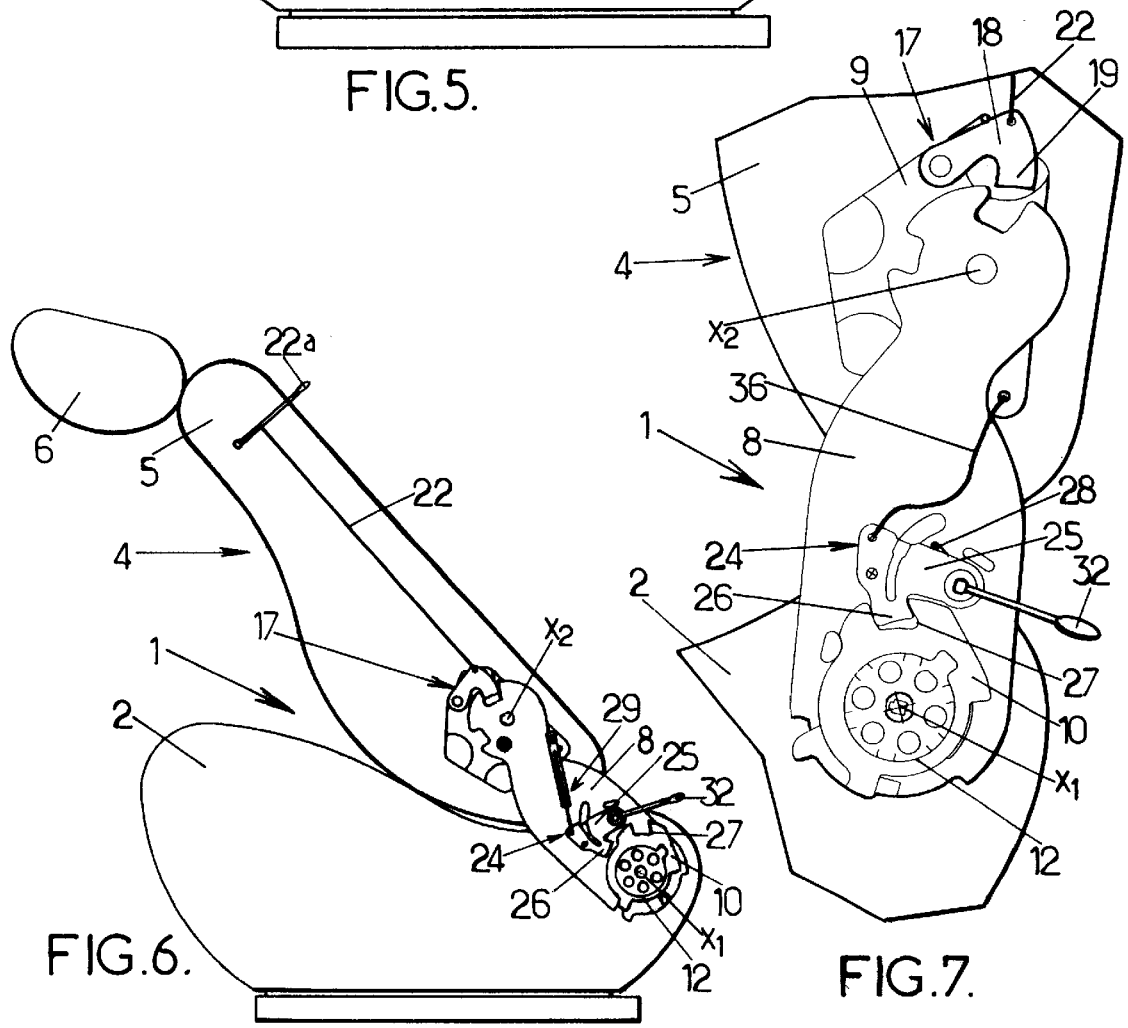
FIG.5.
FIG.6.
FIG.7.

VEHICLE SEAT

FIELD OF THE INVENTION

The present invention relates to vehicle seats.

More specifically, the invention relates to a vehicle seat comprising a backrest and a seat part, the backrest in turn comprising:

- a bottom part comprising a support frame which is pivotally mounted about a first transverse, horizontal axis of rotation by means of a pivot mechanism designed to allow a user to adjust an angular position of the backrest relative to the seat part,
- and a top part pivotally mounted on the support frame about a second transverse, horizontal pivot axis parallel with the first axis, the top part of the backrest being linked to the support frame by means of a first locking mechanism designed to link the top part of the backrest to the support frame at least in an angular position of normal usage, the first locking mechanism being controlled by a first operating member to release the top part of the backrest, allowing it to pivot about the second axis, at least so as to fold it forward from the normal position of usage as far as a flat position in which said top part is disposed substantially horizontally.

BACKGROUND OF THE INVENTION

Document FR-A-2 770 811 describes an example of a vehicle seat of this type.

In the known seats of this type, when the top part of the backrest is in this flat position, the inclination depends on the angular position of the bottom part of the backrest, which was adjusted by the user by means of the pivot mechanism. As a result, said flat position is poorly defined and in certain instances the top part of the backrest may be too far inclined for its rear face to be used as a tray surface under the best conditions.

OBJECTS AND SUMMARY OF THE INVENTION

The objective of this invention is to overcome this particular drawback.

To this end, the invention proposes a seat of the type in question, characterised in that:

- the support frame is linked to the pivot mechanism by means of an intermediate frame pivotally mounted, relative to the seat part, about the first axis, the intermediate frame being linked to the seat part by the pivot mechanism,
- the support frame is linked to the intermediate frame by means of a second locking mechanism, this second locking mechanism being controlled by a second operating member which can be displaced between, firstly, a locking position in which said locking mechanism immobilizes the support frame relative to the intermediate frame, and, secondly, an unlocked position in which the second operating member releases the second locking mechanism, enabling the support frame to pivot freely, relative to the intermediate frame, about the first axis,
- the second operating member is linked to the top part of the backrest by means of a mechanical coupling device, which is designed to displace the second operating member into its unlocked position when the top part of the backrest is in its flat position and to allow the second operating member to be displaced into the locked position when the top part of the backrest is in the usage position,
- and the top part of the backrest is designed to co-operate with the seat part by means of a stop when said top part is in the flat position, in order to restrict displacement of the top part of the backrest when folded forward.

As a result of these features, the incline of the top part of the backrest in the flat position is defined solely by the abutment of said top part on the seat part, so that this position does not depend on adjustments made to the pivot mechanism and can be fixed in an optimum manner.

In preferred embodiments of the invention, one and/or the other of the following features may be incorporated:

- the first locking mechanism is designed to lock the top part of the backrest on the support frame when said top part is in its flat position;
- the first locking mechanism comprises a catch which is mounted on a first element and which is designed to co-operate with a second element, the first and second elements being constituted firstly by the top part of the backrest and secondly by the support frame, it being possible to displace the catch between an active position in which it co-operates with the second element and a clear position in which it does not interfere with said second element, said screw being elastically biased towards its active position and being displaceable from its active position to its clear position by means of the first operating member, and the second element having two notches designed to co-operate with the catch, immobilizing the top part of the backrest respectively when said top part of the backrest is in its position of usage and in its flat position;
- the second operating member is linked to a control member accessible to a user so as to displace said second operating member from its operating position, the mechanical coupling device being designed to allow this displacement of the second operating member when the top part of the backrest is in the normal position of usage;
- the mechanical coupling device comprises first and second coupling members, which are slidingly mounted relative to one another between the first and second stop positions and which are linked respectively to the top part of the backrest and to the second operating member, the first and second coupling members being disposed so that the first coupling member is displaced as far as the first stop position relative to the second coupling member when the top part of the backrest is folded into the flat position, in turn driving the second operating member with it from its locked position into its unlocked position;
- the mechanical coupling device is designed so that the first coupling member is in a non-operating position separate from the first stop position relative to the second coupling member when the top part of the backrest is in its position of normal usage relative to the support frame and when the second operating member is in its locked position, this non-operating position being such that the first coupling member does not drive the second operating member into its unlocked position unless the top part of the backrest has reached its flat position relative to the support frame;
- the mechanical coupling device is designed so that the first coupling member is disposed in a non-operating position separate from the second stop position relative to the second coupling member when the top part of the backrest is in its normal usage position relative to the support frame and when the second operating member is in its locking position, this non-operating position being sufficiently spaced back from the second stop position to allow the second operating member to be displaced from its locked position to its unlocked position when the top part of the backrest is in its normal usage position;

the mechanical coupling device has a flexible cable which links the top part of the backrest to the second operating member, this flexible cable being disposed so that it drives the second operating member from its locked position into its unlocked position when the top part of the backrest pivots from its position of usage into its flat position relative to the support frame;

the cable is not tensed between the top part of the backrest and the second operating member when said top part of the backrest is in its normal usage position relative to the support frame, this cable being of a sufficient length so that the second operating member is not driven into its unlocked position until the top part of the backrest has reached its flat position;

the pivot mechanism comprises a rotating control member and is designed to drive the intermediate frame positively in rotation about the first axis when the control member is rotated.

BRIEF DESCRIPTION OF THE DRAWINGS

Other features and advantages of the invention will become clear from the following description of its two embodiments, given by way of illustration and not restrictive in any respect, and with reference to the appended drawings.

Of the drawings:

FIG. 1 is a schematic illustration of a first embodiment of a vehicle seat proposed by the invention, in a normal position of usage, FIGS. 2 and 3 are details in perspective views showing the bottom part of the backrest of the seat illustrated in FIG. 1, in a normal usage position, FIG. 3 being a partial view along the direction III of FIG. 2, FIG. 4 is a view of a detail showing the bottom part of the backrest of the seat of FIG. 1, at the start of the folding movement of the top part of the backrest into its flat position, FIG. 5 is a schematic view of the seat illustrated in FIG. 1, with the top part of its backrest folded down into a flat position, FIG. 6 is a schematic view of the seat illustrated in FIG. 1, with its entire backrest folded forward, and FIG. 7 is a side view of the bottom part of the backrest in a second embodiment proposed by the invention.

MORE DETAILED DESCRIPTION

The same reference numbers are used to denote the same or similar elements in the different drawings.

FIG. 1 illustrates a motor vehicle seat 1, in this case a front seat (although the invention could, of course, also be applied to a rear seat), this seat comprising a seat part 2 mounted on the floor 3 of the vehicle and a backrest 4 which is pivotally mounted on the seat part about a first transverse, horizontal axis X1.

The backrest 4 comprises a top part 5, which, in the example illustrated here, consists of a headrest 6, and which is pivotally mounted on a bottom part 7 of the backrest about a second transverse, horizontal axis X2 parallel with the first axis X1.

As may be seen from FIGS. 1 to 3, the bottom part 7 of the backrest comprises:

a support frame 8, which, in the example illustrated here, comprises two sheet-metal side plates disposed on either side of the seat, this support frame being pivotally linked, about the second axis X2, to metal side plates 9 belonging to the frame of the top part of the backrest and which are disposed on either side of said top part 5, the support frame 8 also being pivotally mounted on the seat part about the first axis X1, and an intermediate frame 10, disposed at least on one side of the seat and linked to the frame 11 of the seat part by means of a pivot mechanism 12 controlled by a rotating handle 13 (FIG. 1).

By preference, the pivot mechanism 12, clearly visible in FIGS. 2 and 3, is a gear mechanism designed to drive the intermediate frame 10 positively about the first axis X1 when the handle 13 is rotated by the user. By way of example, although this is not restrictive, the pivot mechanism 12 may be of the type disclosed in document EP-A-0 505 229, this mechanism comprising two metal side plates 14, 15 linked to one another by means of a crimped annular ring 16 forming a housing enclosing the gear mechanism mentioned above.

In another variant, the pivot mechanism could comprise a control member other than the handle 13, for example a control member driven by an electric motor (not illustrated), in turn controlled by the user. Alternatively, the pivot mechanism could be of any other known type which would enable the inclination of the backrest 4 to be adjusted.

Furthermore, the top part 5 of the backrest is linked to the support frame 8 by a first locking mechanism 17 which, in the example illustrated, comprises an operating member in the form of a lever 18 pivotally mounted on the side plate 9 of the top part of the backrest. This lever 18 is terminated by a catch 19 in the form of a hook designed to penetrate at least a first notch 20 of the support frame 8 in order to immobilize the top part 5 of the backrest relative to said support frame, at least in a normal usage position corresponding to the position in which the backrest is raised.

The lever 18 is elastically biased, by a spring 21, towards a locked position in which the catch 19 penetrates the notch 20, and said lever 18 is also able to pivot, for example under the action of a cable 22 operated in particular by means of a lever 22a accessible to a user, as far as an unlocked position in which the catch 19 no longer interferes with the support frame 8 and releases the top part 5 of the backrest, which is then able to pivot forward about the axis X2 as far as a flat position in which the catch 19 penetrates a second notch 23 provided in the support frame 8.

Furthermore, the support frame 8 is linked to the intermediate frame 10 by means of a second locking mechanism 24 which is similar to the first locking mechanism and which in turn has an operating member in the form of a lever 25 pivotally mounted on the support frame 8, this lever bearing a catch in the form of a hook 26 designed to penetrate a notch 27 in the intermediate frame 10 in order to immobilize the support frame 8 relative to said intermediate frame.

A spring 28 normally retains the lever 25 in the locked position, which corresponds to the catch 26 in the notch 27, and it can also be displaced into an unlocked position in which the catch 26 does not interfere with the intermediate frame 10, this displacement being effected by means of a mechanical coupling device 29, in this case a sliding connecting rod which links the lever 25 to the side plate 9 of the top part of the backrest.

The connecting rod 29 comprises first and second parts 30, 31 which slide relative to one another and which are pivotally mounted on the side plate 9 and on the lever 25 respectively. The first part 30 of the connecting rod slides on the second part 31 between first and second stop positions corresponding respectively to the maximum and minimum lengths of the connecting rod 29. Furthermore, when the top part 5 of the backrest is in its normal usage position and the lever 25 is in a locked position, the first part 30 of the connecting rod is in an intermediate non-operating position between its first and second stop positions.

In addition, as illustrated in FIG. 1, the lever 25 may also be displaced towards its unlocked position by means of a control lever 32 accessible to the user, so as to fold the entire backrest 4 forward, in particular to gain access to the rear seats of the vehicle if the seat 1 is a front seat of a three-door vehicle.

Optionally, the control lever 32 may be omitted if there is no need to enable the user to fold the entire assembly of the seat 4 forward.

The seat described above operates as follows.

In the normal usage position illustrated in 1 to 3, the user can adjust the incline of the backrest 4 as a whole to increase his comfort by rotating the handle 13.

If the user wants to fold the top part 5 of the backrest into the substantially horizontal tray position, he operates the lever 22a, or any other control member, to apply traction to the cable 22 causing the lever 18 to pivot into its unlocked position, as illustrated in FIG. 4.

The top part 5 of the backrest is then able to pivot forward in the direction of arrow 33, either under the action of the user or under the action of a return spring (not illustrated), the top part of the backrest preferably being prevented from pivoting backwards by means of a stop (not illustrated).

During this movement, the sliding connecting rod 29 extends so that the first part 30 of the connecting rod is displaced towards its first stop position relative to the second part 31 of the connecting rod.

When the top part 5 of the backrest reaches its tray position relative to the support frame 8, the catch 19 locates in the second notch 23 of the support frame 8 under the action of the spring 21 and, slightly before this locking action, the first part 30 of the connecting rod reaches its first stop position relative to the second part 31 of the connecting rod, so that the connecting rod 29 raises the lever 25 by displacing it as far as its unlocked position. The unlocked position of the lever 25 is reached at the same time as the top part 5 of the backrest reaches its flat position relative to the support frame 8 so that said support frame is then released so as to rotate relative to the intermediate frame 10.

As illustrated in FIG. 5, the support frame 8 is then pivoted forward under the effect of the weight of the top part 5 of the backrest until the head-rest 6, or any other part of the backrest, moves to abut against a part of the seat 2 (it may be the top face of the seat part 2, as in the example illustrated, or any other solid part of the seat) in order to restrict the forward folding movement of the backrest.

In this position, the rear face 35 of the top part 5 of the backrest is disposed substantially horizontally and objects can be placed on it. When the user then wants to return the backrest to its normal usage position, he pivots the top part 5 of the backrest towards the rear having operated the lever 22a to unlock the first locking mechanism 17. During this pivoting motion towards the rear, the catch 19 of the first locking mechanism 17 moves back to locate in the first notch 20 of the support frame 8 and the catch 26 of the second locking mechanism 24 moves back to locate in its notch 27 under the action of springs 21, 28.

Moreover, as illustrated in FIG. 6, if the seat is provided with the control lever 32, the user will be able to release the second locking mechanism 24 by operating this control lever so that the entire backrest 4 can be pivoted forward to gain access to the rear seats of the vehicle, for example, as explained above.

Because the first part 31 of the connecting rod is initially located in an intermediate position between its first and second stop positions relative to the second part 31 of the connecting rod, the lever 25 of the second locking mechanism can be displaced as far as its unlocked position by shortening the sliding connecting rod 29, without giving rise to any interference between the first and second parts of the sliding connecting rod.

Finally, the second embodiment of the invention, schematically illustrated in FIG. 7, differs from the first embodiment only by dint of the fact that the sliding connecting rod 29 is replaced by a flexible cable 36.

When the seat illustrated in FIG. 7 is in its normal usage position, this flexible cable is not tensed and its length is adapted so that it will not tense and will not displace the second locking mechanism 24 into its unlocked position until the top part 5 of the backrest has reached its flat position relative to the support frame 8.

I claim:

1. A vehicle seat comprising a backrest and a seat part, the backrest comprising:

a bottom part comprising a support frame which is pivotally mounted on the seat part about a first transverse, horizontal pivot axis, by a pivot mechanism designed to allow a user to adjust an angular position of the backrest relative to the seat part, and a top part pivotally mounted on the support frame about a second transverse, horizontal pivot axis parallel with the first pivot axis, the top part of the backrest being linked to the support frame by a first locking mechanism designed to link the top part of the backrest to the support frame at least in an angular position of normal usage, the first locking mechanism being controlled by a first operating member in order to release the top part of the backrest so that said top part can rotate about the second pivot axis, at least so that said top part can be folded forward from the normal usage position as far as a flat position in which said top part is disposed substantially horizontally, wherein the support frame is linked to the pivot mechanism through an intermediate frame pivotally mounted relative to the seat part about the it pivot axis, the intermediate frame being linked to the seat part by the pivot mechanism, wherein the support frame is linked to the intermediate frame by a second locking mechanism, said second locking mechanism being controlled by a second operating member which can be displaced between, firstly, a locked position in which said second locking mechanism immobilizes the support frame relative to the intermediate frame and, secondly, an unlocked position in which the second operating member releases the second locking mechanism enabling the support frame to pivot freely relative to the intermediate frame about the first pivot axis, wherein the second operating member is linked to the top part of the backrest by a mechanical coupling device which is designed to displace the second operating member into the unlocked position when the top part of the backrest is in the flat position and to enable the second operating member to be placed in a locked position when the top part of the backrest is in said position of normal usage, and wherein the top part of the backrest is designed to co-operate with the seat part when said top part is in a flat position in order to restrict the forward folding movement of the top part of the backrest.

2. The seat as claimed in claim 1, in which the first locking mechanism is designed to lock the top part of the backrest onto the support frame when said top part is in the flat position.

3. The seat as claimed in claim 2, in which the first locking mechanism comprises a catch which is pivotally mounted on a first element and which is designed to co-operate with a second element, the first and second elements being, firstly, the top part of the backrest and, secondly, the support frame, the catch being displaceable between an active position in which said catch co-operates with the second element and a clear position in which said catch does not interfere with said second element, said catch being elastically biased towards the active position and being displaceable from the active position into the clear position by the first operating member, and the second element having two notches designed to co-operate with the catch for immobilizing the top part of the backrest when said top part is in the normal usage position and in the flat position respectively.

4. The seat as claimed in claim 1, in which the second operating member is linked to a control member accessible to a user in order to displace said second operating member from the non-operating position into the operating position, the mechanical coupling device being designed to allow displacement of the second operating member when the top part of the backrest is in the normal usage position.

5. The seat as claimed in claim 1, in which the mechanical coupling device comprises first and second coupling members which are slidingly mounted relative to one another and which are linked to the top part of the backrest and to the second operating member respectively, the first and second coupling members being disposed so that the first coupling member is displaced as far as a first stop position relative to the second coupling member when the top part of the backrest is folded into the flat position, thereby driving the second operating member from the locked position into the unlocked position.

6. The seat as claimed in claim 5, in which the mechanical coupling device is designed so that the first coupling member is disposed in a non-operating position separate from the first stop position relative to the second coupling member when the top part of the backrest is in the normal usage position relative to the support frame and when the second operating member is in the locked position, said non-operating position being designed so that the first coupling member does not drive the second operating member into the unlocked position until the top part of the backrest reaches the flat position relative to the support frame.

7. The seat as claimed in claim 5, in which the mechanical coupling device is designed so that the first coupling member is able to slide freely relative to the second coupling member when the second operating member is displaced from the locked position into the unlocked position while the top part of the backrest is in the normal position of usage.

8. The seat as claimed in claim 1, in which the mechanical coupling device comprises a flexible cable which links the top part of the backrest to the second operating member, said flexible cable being disposed so as to drive the second operating member from the locked position into the unlocked position when the top part of the backrest pivots from the normal usage position into the flat position relative to the support frame.

9. The seat as claimed in claim 8, in which the cable is not tensed between the top part of the backrest and the second operating member when said top part of the backrest is in the normal usage position relative to the support member, said cable being of a sufficient length so that the second operating member is not driven into the unlocked position until the top part of the backrest reaches the flat position.

10. The seat as claimed in claim 1, in which the pivot mechanism comprises a rotating control member and is designed to drive the intermediate frame positively in rotation about the first pivot axis when the control member is rotated.

* * * * *